(12) United States Patent
Kaltenbrunn et al.

(10) Patent No.: US 6,591,811 B2
(45) Date of Patent: Jul. 15, 2003

(54) DEVICE FOR CONTROLLING AN INTERNAL COMBUSTION ENGINE

(75) Inventors: Peter Kaltenbrunn, Bietigheim-Bissingen (DE); Werner Hess, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 09/738,014

(22) Filed: Dec. 15, 2000

(65) Prior Publication Data

US 2001/0010215 A1 Aug. 2, 2001

(30) Foreign Application Priority Data

Dec. 18, 1999 (DE) .......................................... 199 61 290

(51) Int. Cl.$^7$ .............................................. F02M 59/20
(52) U.S. Cl. ........................ 123/435; 123/436; 123/677; 123/681
(58) Field of Search ................................. 123/435, 686, 123/436, 677, 681

(56) References Cited

U.S. PATENT DOCUMENTS 4,185,460 A * 1/1980 Moore et al. ..................... 60/2
4,819,187 A * 4/1989 Yasue et al. ................. 123/435
5,778,857 A * 7/1998 Nakamura et al. ........... 123/435
6,045,482 A * 4/2000 Nishar et al. ............. 123/41.13

FOREIGN PATENT DOCUMENTS

DE     42 39 711     6/1994
DE     44 26 494     2/1996

* cited by examiner

Primary Examiner—Erick Solis
(74) Attorney, Agent, or Firm—Kenyon & Kenyon

(57) ABSTRACT

A device for controlling an internal combustion engine having an arrangement for recording operating parameters of the internal combustion engine, such as engine speed, load, and coolant temperature; an arrangement for providing a signal related to a desired drive torque of the internal combustion engine (engine torque) as a function of the recorded performance quantities; and an arrangement for converting the engine torque into control signals for at least one of the variables air supply or fuel supply to the internal combustion engine, as a function of the coolant temperature toot and of a pre definable maximum allowable coolant temperature limit tom-tom, a torque control value being determined which ultimately determines the allowable engine torque.

8 Claims, 1 Drawing Sheet

DEVICE FOR CONTROLLING AN INTERNAL COMBUSTION ENGINE

BACKGROUND INFORMATION

A device for controlling a vehicle is described in German Patent No. DE 42 39 711. The device has an interface, which is defined among various subsystems and via which torque-based information is transmitted. This information includes, in particular, controlled variables, which are generated in a valve-timing unit of an engine or internal combustion engine and which relate to torque values. The various subsystems of the valve-timing unit communicate with one another (exchange data) on the basis of these torque values.

It is an intention of the present invention to expand a system of this kind by adding a sub-component that will take the engine coolant temperature into consideration, in the sense of a protective function.

Monitoring the coolant temperature in an internal combustion engine has long been state of the art. In this context, one concern is the requirement to bring the internal combustion engine to its operating temperature as quickly as possible, in particular with respect to exhaust treatment. Another concern is to protect the internal combustion engine from thermal overload. Mentioned here by way of example is German Patent No. DE 44 26 494, which relates to a device for monitoring the coolant system in an internal combustion engine. This patent describes monitoring internal combustion engine temperature and coolant temperature and activating warning and fault storage systems in the event of a fault.

SUMMARY OF THE INVENTION

The device for controlling an internal combustion engine in accordance with the present invention enables an internal combustion engine control system, which functions using a so-called torque structure, to effectively and optimally implement a protective function, which uses the coolant temperature as a baseline.

BRIEF DESCRIPTION OF THE DRAWINGS

The FIGURE shows a general diagram for purposes of considering the internal combustion engine temperature within the framework of a protective function for the torque-based control system.

DETAILED DESCRIPTION

Figure 1:
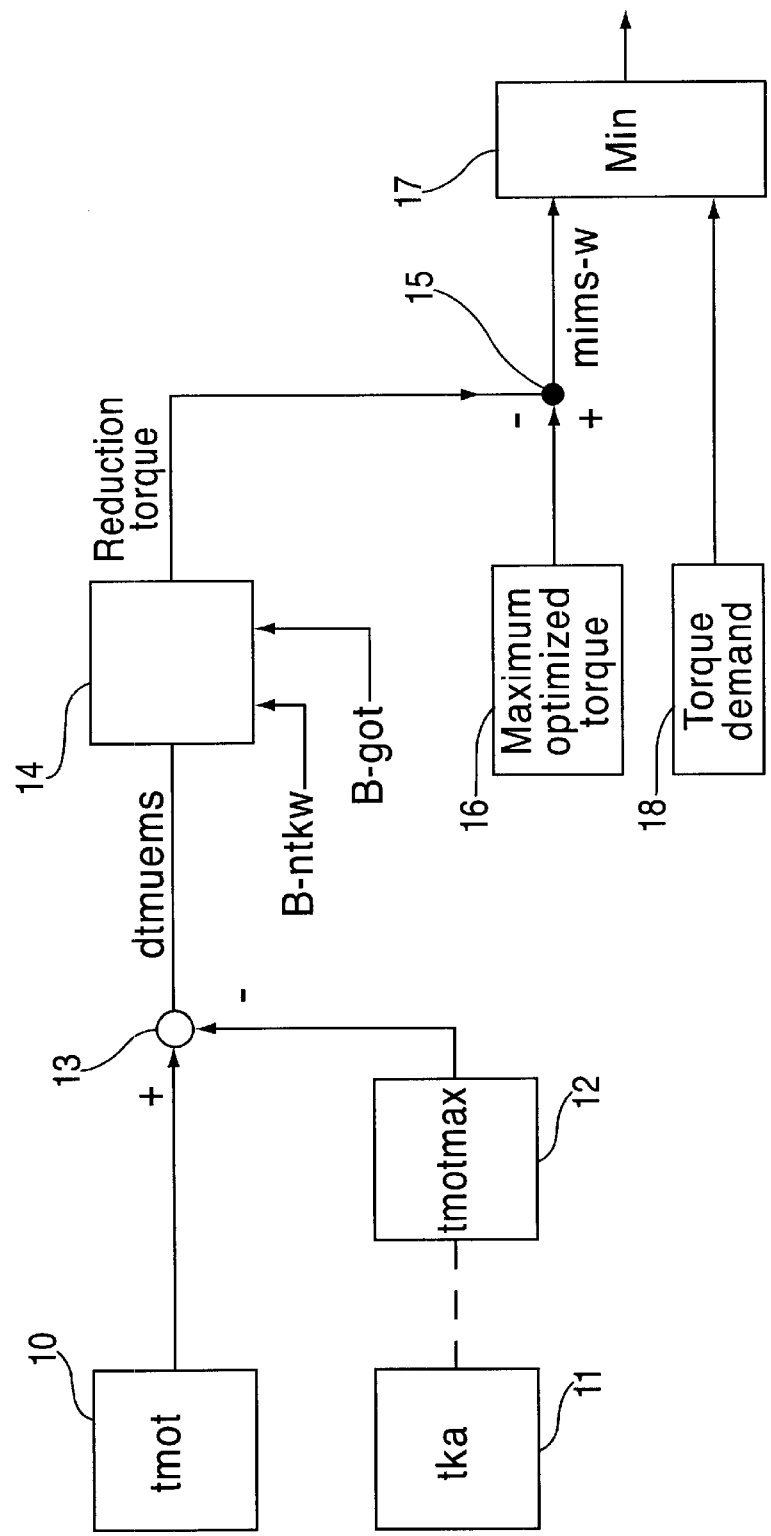

The device for controlling an internal combustion engine described in the following is based on German Patent No. DE 42 39 711, the disclosure of which is expressly incorporated by reference herein.

An object of the present invention is to prevent thermal overload and high component temperatures in internal combustion engines. This is achieved by using reduction, in particular of the air volume, to decrease the heat input of (heat added by) a cylinder charge before the maximum allowable coolant temperature is exceeded. In this context, besides reducing the air volume, other measures are practicable, such as reducing the fuel quantity, changing the ignition firing point, and changing the start of injection in diesel and gasoline direct-injection internal combustion engines.

The heat content of a cylinder charge essentially determines the torque of an internal combustion engine. In this context, the air volume of a cylinder charge is a direct measure of the heat content. The air volume, on the other hand, is dependent on the position of the accelerator. A torque-based functional structure, which takes into consideration the amount of air desired by the driver when triggering the throttle valve, makes it possible to reduce the trigger value of the throttle valve in response to the exceeding of the coolant temperature limiting value.

In the specific exemplary embodiment depicted in the FIGURE, 10 designates a sensor for the internal combustion engine temperature or engine temperature, which is recorded as coolant temperature (toot). 11 designates a sensor for determining the coolant temperature at the radiator outlet tea, this value representing a measure of the cooling capacity of the radiator. Sensor 11 communicates with a signal processing unit 12, at whose output a signal is provided that is indicative of a maximum allowable coolant temperature limit. A subtraction point 13 calculates the temperature differential drummers between the instantaneous coolant temperature toot and the specifiable maximum permissible coolant temperature limit tom-tom. The differential signal is fed to a subsequent controller 14, which makes available a reduction torque at its output. Additional input variables of controller 14, which exhibits speed-droop (proportional) characteristics, are a signal B-ntkw for a heat exchanger protection, as well as B-got for the transmission oil temperature. A subtraction operation 15 follows, which, as a further input variable, receives a signal with respect to a maximum, optimized torque from unit 16. The value determined by subtraction operation 15 represents the allowable engine torque for the engine protection mims-w and generates an input variable for subsequent minimum value selection step 17, which is supplied with the instantaneous torque demand, as at least one additional input variable, from signal processing unit 18.

A main idea of the device made apparent by the FIGURE is to produce, at the outset, the differential temperature drummers between the instantaneous coolant temperature toot and a specifiable maximum allowable coolant temperature limit tom-tom. In this context, the dotted line between sensor 11 for the coolant temperature at the radiator outlet tea and unit 12 for providing the maximum permissible coolant temperature limit indicates that this value can either be a set variable or can be made dependent on the cooling capacity of the system, the cooling capacity being reflected in the coolant temperature signal at radiator outlet tea. The calculated temperature differential drummers is a measure of the coolant temperature toot approaching or exceeding the maximum allowable coolant temperature limit tomotmax and is used by subsequent controller 14 as a basis for preparing a reduction torque in the internal combustion engine control. In response to external requirements, such as low coolant temperature for heat exchanger protection B-ntkw or in response to excess transmission oil temperature B-got, a switch can be made to different application data for proportional-action controller 14.

Additional important external requirements can come, for example, from the "thermomanagement" system or from emergency operational measures, such as "fan defective."

In the subsequent coordination of torques to the charge level in the specific exemplary embodiment of one action on (intervention in) the throttle valve position, the torque input by the driver for the cylinder charge is reduced by a minimum selection 17 between requested torque input 18 and the calculated engine protection torque mims-w.

Alternatively, the cylinder charge can also be directly reduced by changing the throttle valve position or by shutting off or fading out the cylinder.

Additionally, a suitable indicator can be provided, which informs the driver of active torque reduction for engine protection during vehicle operation.

As recited at the outset, the system described above is not limited to systems acting on the position of the throttle valve, but can be used in any instance when torque can be reduced by controlling the internal combustion engine values.

The device in accordance with the present invention not only relates to gasoline internal combustion engines having multi-point injection, but also to gasoline direct-injection engines, as well as to diesel internal combustion engines. In this context, torque control in known methods heretofore, for which the aforementioned German Patent No. DE 42 39 711 is a representative, verifies that one skilled in the art is familiar with setting a specific torque for the different types of internal combustion engines.

What is claimed is:

1. A device for controlling an internal combustion engine, comprising:

means for recording operating parameters of the engine;

means for providing a signal relating to a desired drive torque of the engine as a function of the recorded operating parameters;

means for converting the engine torque into control signals for at least one of an air supply and a fuel supply to the engine; and means for determining, as a function of a coolant temperature and of a predefined maximum allowable coolant temperature limit, a torque control value, the torque control value ultimately determining an allowable engine torque.

2. The device according to claim 1, wherein the operating parameters include at least one of an engine speed, a load and a coolant temperature.

3. The device according to claim 1, wherein the predefined maximum allowable coolant temperature limit is dependent on an available cooling capacity.

4. The device according to claim 1, wherein the torque control value is determined as a function of a difference from the coolant temperature and of the predefined maximum allowable coolant temperature limit.

5. The device according to claim 1, wherein the means for determining includes a proportional-action controller.

6. The device according to claim 5, wherein a speed drop of the controller is a function of at least one of a coolant temperature and a transmission oil temperature.

7. The device according to claim 1, wherein the torque control value acts on a minimum selection in connection with a requested torque input by a driver.

8. A device for controlling an internal combustion engine, comprising:

means for recording operating parameters of the engine;

means for providing a signal relating to a desired drive torque of the engine as a function of the recorded operating parameters;

means for converting the engine torque into control signals for at least one of an air supply and a fuel supply to the engine;

means for determining, as a function of a coolant temperature and of a predefined maximum allowable coolant temperature limit, a torque control value, the torque control value ultimately determining an allowable engine torque, wherein the predefined maximum allowable coolant temperature limit is dependent on an available cooling capacity; and means for determining the available cooling capacity as a function of a coolant temperature at a radiator outlet.

* * * * *

UNITED STATES PATENT AND TRADEMARK OFFICE
CERTIFICATE OF CORRECTION

PATENT NO.   : 6,591,811 B2
DATED        : July 15, 2003
INVENTOR(S)  : Peter Kaltenbrunn et al.

It is certified that error appears in the above-identified patent and that said Letters Patent is hereby corrected as shown below:

<u>Title page,</u>
Item [57], ABSTRACT,
Line 11, change "toot and of a pre definable" to -- tmot and of a predefinable --.
Line 12, change "tom-tom" to -- tmotm --.

<u>Column 2,</u>
Line 10, change "(toot)." to -- (tmot). --.
Lines 12, 41 and 45, change "tea" to -- tka --.
Lines 17, 37 and 46, change "drummers" to -- dtmuems --.
Lines 18 and 47, change "toot" to -- tmot --.
Line 19, change "tom-tom." to -- tmotmax. --.
Line 39, change "tom-tom" to -- tmotmax --.

Signed and Sealed this

Third Day of January, 2006

JON W. DUDAS
*Director of the United States Patent and Trademark Office*